United States Patent
Sinkar et al.

(10) Patent No.: US 12,475,145 B2
(45) Date of Patent: *Nov. 18, 2025

(54) SYSTEMS AND METHODS FOR AUTOMATED DATA GOVERNANCE

(71) Applicant: Capital One Services, LLC, McLean, VA (US)

(72) Inventors: Aniket Sinkar, Glen Allen, VA (US); Manisha Purkar, Glen Allen, VA (US); Sindhu Myla, Glen Allen, VA (US); Sovon Nath, Glen Allen, VA (US); Richard Shi, Henrico, VA (US); Bindiya Goppenahalli Mahadeva, Glen Allen, VA (US); Cameron Utsman, Richmond, VA (US); Ajay Shinde, Henrico, VA (US); Mark Mabry, Glen Allen, VA (US); Daniel Hanson, Richmond, VA (US); Arindam Chakraborty, Glen Allen, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,186

(22) Filed: Oct. 25, 2023

(65) Prior Publication Data
US 2024/0054150 A1    Feb. 15, 2024

Related U.S. Application Data

(63) Continuation of application No. 17/220,949, filed on Apr. 2, 2021, now Pat. No. 11,847,143.

(51) Int. Cl.
*G06F 16/28* (2019.01)
*G06F 16/245* (2019.01)

(52) U.S. Cl.
CPC .......... *G06F 16/285* (2019.01); *G06F 16/245* (2019.01)

(58) Field of Classification Search
None
See application file for complete search history.

(56) References Cited

U.S. PATENT DOCUMENTS 7,941,438 B2 * 5/2011 Molina-Moreno ....... G06F 8/35
717/109
7,971,231 B2   6/2011 Gupta et al.
(Continued)

OTHER PUBLICATIONS

Bernhard Haslhofer; A Survey of Techniques for Achieving Metadata Interoperability; ACM Computing Surveys, vol. 42, No. 2, Article 7; 2010; pp. 1-37.*

(Continued)

*Primary Examiner* — Ann J Lo
*Assistant Examiner* — Jermaine A Mincey
(74) *Attorney, Agent, or Firm* — TROUTMAN PEPPER LOCKE LLP; Christopher J. Forstner; John A. Morrissett

(57) ABSTRACT

Systems and methods for providing automated data governance are disclosed. The system may include a plurality of data environments, a metadata repository storing data attributes and classification requirements, a policy repository, one or more processors, and a memory in communication with the one or more processors storing instructions to execute steps of a method. The system may receive a first dataset from a first data environment having a first dataset ID. The system may transmit the dataset ID to the metadata repository and the metadata repository may return an indication that the first dataset includes at least one data attribute and at least one associated classification requirement. The system may transmit the classification requirement to the policy repository and receive classification code associated with the classification requirement. The system may modify (Continued)

the first dataset by transmitting instructions to the first data environment to execute the classification code.

20 Claims, 9 Drawing Sheets

(56) References Cited

U.S. PATENT DOCUMENTS

| | | |
|---|---|---|
| 8,276,152 B2 | 9/2012 | Sanghvi |
| 8,645,326 B2 | 2/2014 | Weizman et al. |
| 8,782,201 B2 | 7/2014 | Kephart et al. |
| 9,495,651 B2 | 11/2016 | O'Sullivan et al. |
| 11,269,824 B1 * | 3/2022 | Waas ................. G06F 16/2448 |
| 2004/0215662 A1 | 10/2004 | Rangadass |
| 2013/0219054 A1 | 8/2013 | Birkler et al. |
| 2016/0132828 A1 | 5/2016 | Hartung et al. |
| 2018/0077027 A1 * | 3/2018 | VanderKwaak ........ H04L 41/40 |
| 2018/0367575 A1 * | 12/2018 | Narayanaswamy ........................ H04L 63/0281 |
| 2021/0034571 A1 * | 2/2021 | Bedadala .............. G06F 16/134 |

OTHER PUBLICATIONS

De Dinechin, B.D. et al, "A Clustered Manycore Processor Architecture for Embedded and Accelerated Applications," IEEE; 2013; pp. 1-6 (Year: 2013).

Singh, "Scalable Metadata Management Techniquest for Ultra-Large Distributed Storage Systems, A Systematic Review," ACM: 2018; pp. 1-27 (Year: 2018).

* cited by examiner

SYSTEMS AND METHODS FOR AUTOMATED DATA GOVERNANCE

CROSS-REFERENCE TO RELATED APPLICATIONS

This application is a continuation of, and claims priority under 35 U.S.C. § 120 to, U.S. patent application Ser. No. 17/220,949, filed Apr. 2, 2021, the entire contents of which are fully incorporated herein by reference.

FIELD

The disclosed technology relates to systems and methods for automated data governance, and more particularly to systems and methods for automatically generating and distributing code associated with data governance policies to production environments.

BACKGROUND

Many organizations have information technology (IT) infrastructure that includes a variety of environments. For example, an organization may have a production environment which includes publicly accessible applications and/or services and one or more test environments which include data accessible only to certain agents within the organization and configured for specific use cases. Each production environment may include unique policies for data governance including data anonymization, masking, and tokenization, depending on the use case of each production environment. Organizations may need to comply with many different regulations applicable to various asset classes of information under the organization's control. For example, sensitive information about customers and/or employees may be governed by legal regulations.

Organizations typically utilize a configuration management database (CMDB) for collecting and storing information about data assets contained in their data environments. CMDBs may be used for recording several types of information about these data assets—for example, CMDBs may store technical attributes associated with each data asset, relationship attributes associated with each data asset, and ownership attributes. Data is often transferred between different data environments, and organizations must ensure that appropriate data governance policies are enforced in each data environment. However, traditional systems and methods for enforcing data governance require actors within an organization to manually update the code that generates these datasets within each data environment to conform to the applicable data policies to comply with regulations. Also, when regulations change the actors have to apply the changed regulations to each dataset within the organization manually.

Accordingly, there is a need for systems and methods to provide automated data governance across all data environments in an organization. Embodiments of the present disclosure are directed to this and other considerations.

SUMMARY

Disclosed herein are systems and methods for automated data governance. Consistent with the disclosed embodiments, a system is provided for automated data governance. The system includes a plurality of data environments, a metadata repository storing a plurality of data attributes and a plurality of classification requirements, and a policy repository. The system includes one or more processors and memory in communication with the one or more processors and storing instructions that, when executed by the one or more processors, cause the system to perform one or more steps of a method for providing automated data governance. The system may receive a first dataset and a first policy ID, i.e. a context (e.g., data environment) in which the system is being invoked, from a first data environment. The first dataset may include a first dataset ID. The system may transmit the first dataset ID and the first policy ID to the metadata repository. The system may receive an indication from the metadata repository that the first dataset contains at least one data attribute and at least one first associated classification requirement. The system may transmit the at least one first classification requirement to the policy repository. The system may receive a first classification code associated with the at least one first classification requirement from the policy repository. In response to receiving the first classification code, the system may modify the first dataset by transmitting instructions to the first data environment to execute the first classification code.

Consistent with the disclosed embodiments, a system for automated governance is disclosed. The system includes a plurality of data environments, a metadata repository storing a plurality of data attributes and a plurality of classification requirements, and a policy repository. The system includes one or more processors and memory in communication with the one or more processors and storing instructions that, when executed by the one or more processors, cause the system to perform one or more steps of a method for providing automated data governance. The system receive an indication from the metadata repository that a first data attribute has been updated to include a first classification requirement. The system may query the metadata repository for a dataset ID associated with a dataset including the first data attribute. The system may determine that a first dataset having the dataset ID is stored on a first data environment of the plurality of data environments. The system may transmit the first classification requirement to the policy repository. In response, the system may receive a first classification code associated with the first classification requirement. The system may modify the first dataset by transmitting instructions to the first database to execute the first data environment to execute the first classification code.

Consistent with the disclosed embodiments, a system for automated governance is disclosed. The system includes a plurality of data environments, a metadata repository storing a plurality of data attributes and a plurality of classification requirements, and a policy repository. The system includes one or more processors and memory in communication with the one or more processors and storing instructions that, when executed by the one or more processors, cause the system to perform one or more steps of a method for providing automated data governance. The system may receive a request to publish a first dataset having a first dataset ID to a first data environment. The system may query the metadata repository to identify at least one data attribute and an associated classification requirement for the first dataset based on the first dataset ID. The system may query the policy repository for classification code associated with the classification requirement. The system may modify the first dataset by transmitting instructions to the first data environment to execute the classification code.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
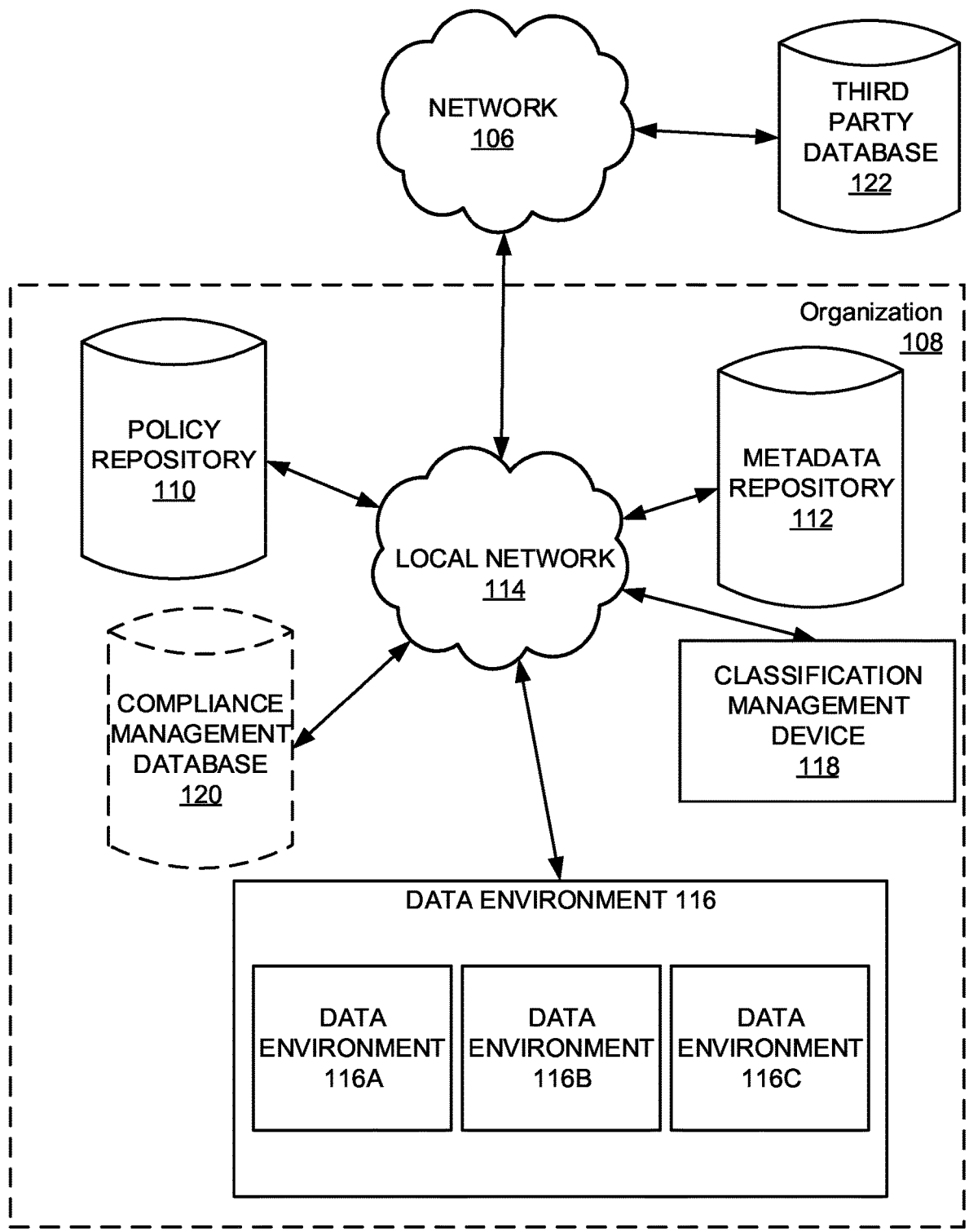
FIG. 1 is a block diagram of an example system 100 that may be used to enforce automated data governance according to a classification requirement, in accordance with certain embodiments of the disclosed technology.

According to certain example implementations of the disclosed technology, systems and methods are disclosed herein for providing automated data governance across data environments present in an organization. For example, in one aspect, a system is provided for autonomously applying code arguments to datasets present in a given data environment of an organization.

A classification management device may receive a dataset stored on a data environment. The classification management device may identify a dataset ID associated with the dataset. The classification management device may access a metadata repository and query the metadata repository for at least one data attribute and an associated classification requirement based on the dataset ID. After receiving the data attribute and associated classification requirement from the metadata repository, the classification management device may be configured to transmit the at least one classification requirement to a policy repository. The policy repository may be configured to return classification code associated with the at least one classification requirement to the classification management device. The classification management device may transmit instructions to the respective data environment to modify the dataset by executing the first classification code on the dataset.

According to some embodiments, the classification management device may monitor the metadata repository for an indication that a dataset will be copied from a first data environment to a second data environment. The classification management device may receive a second classification requirement for at least one data attribute that is specific to the second data environment. The classification management device may transmit the second classification requirement to the policy repository, which may return a second classification code associated with the second classification requirement. The classification management device may proactively transmit instructions to the second data environment to execute the second classification code when the dataset is copied to the second data environment.

According to some embodiments, the classification management device may also receive an indication from the metadata repository that a dataset has already been copied to a second data environment. The classification management device may determine a second classification requirement for at least one data attribute specific to the second data environment, transmit the second classification requirement to the policy repository, and receive from the policy repository second classification code associated with the second classification requirement. Responsive to receiving the second classification requirement, the classification management device may transmit instructions to the second data environment to execute the second classification code.

According to some embodiments, the classification management device may generate a report indicative of changes implemented on a given dataset in a respective data environment. The report may include the classification requirement applied to any given dataset based on the data environment it has been copied to, a change log for policies being applied based on the classification requirement, including a time and date of any changes made, as well as approvals of the policies to be applied provided by a data steward, including a data steward name, and the time and date of the approval. According to some embodiments, the report may be uploaded to a compliance management database. In some embodiments, the report may be uploaded to a third-party database.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a block diagram of an example system 100 that may be used to automated data governance policies, in accordance with the disclosed embodiments. System 100 may be configured to perform one or more processes that automate data governance policies such that datasets are automatically modified in accordance with classification policies, which may be specific to the various data environments present on system 100. The components and arrangements shown in FIG. 1 are not intended to limit the disclose embodiments as the components used to implement the disclosed processes and features may vary. As shown, system 100 may interact with a third-party database 122 via a network 106. In certain example implementations, system 100 may include a policy repository 110, metadata repository 112, local network 114, data environment 116, classification management device 118, and compliance management database 120. According to some embodiments, policy repository 110, metadata repository 112, local network 114, data environment 116, classification management device 118, and compliance management database 120 may be controlled by an organization 108.

Network 106 may be of any suitable type, including individual connections via the internet such as cellular or WiFi networks. In some embodiments, the network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 106 may include any type of computer networking arrangement used to exchange data. For example, the network 106 may be the Internet, a private data network, virtual private network using a public network, and/or other suitable connection(s) that enable(s) components in the system 100 environment to send and receive information between the components of the system 100. The network 106 may also include a public switched telephone network ("PSTN") and/or a wireless network.

In accordance with certain example implementations, a third-party database 122 may be in communication with system 100 via network 106. In certain implementations, third-party database 122 can include a computer system associated with an entity (other than the entity associated with system 100 and its customers) that performs one or more functions associated with system 100. For example, the third-party database 122 can include one or more datasets which may be provided to system 100 and that may be utilized in one or more data environments 116 (e.g., data environment 116A, data environment 116B, data environment 116C, etc.). These datasets may be provided to system 100 by a third-party entity (e.g., from third-party database 122) for use by organization 108.

System 100 may be associated with and optionally controlled by an organization 108 such as a business, corporation, individual, partnership, or any other entity that provides one or more of goods, services, and consultations to individuals such as users or customers. The system 100 may include one or more servers and computer systems for performing one or more functions associated with products and/or services that the organization provides. Such servers and computer systems may include, for example, the policy repository 110, metadata repository 112, local network 114, data environment(s) 116, classification management device 118, compliance management database 120, as well as any other computer systems necessary to accomplish tasks associated with the organization or the needs of users of system 100.

The policy repository 110 may include a repository of data governance policies that may be automatically applied to datasets housed in the data environment(s) 116 of system 100. The policy repository 110, for example, may include a computer system configured to receive communications from classification management device 118 via for example, one or more application programming interface (API) calls, or any other type or format of electronic communication. Information stored in policy repository 110 may be accessed (e.g., retrieved, updated, and added to) via local network 114 (and/or network 106) by one or more devices (e.g., classification management device 118 and/or data environment(s) 116) of system 100. According to some embodiments, policy repository 110 stores standardized code arguments for applying a respective policy to a dataset stored in one of data environment(s) 116. For example, when the classification requirement provided by metadata repository 112 includes a tokenization request, policy repository 110 may return a list of approved code arguments that can be automatically applied to a dataset. For tokenization request, approved code arguments may include one of a turing.tokenize standardized code, or voltage.tokenize standardized code which may be applied to a dataset stored in one of data environment(s) 116. When the returned classification requirement is for data masking, policy repository may return standardized code for data masking, such as synthesizer.scrub, TDM.scrub, and/or faker.fake These code arguments may be received by classification management device and automatically applied to respective entries in the dataset. However, the approved code arguments for both tokenization requests and data masking provided above are exemplary in nature and not meant to limit the scope of the disclosure. In another non-limiting example, policy repository 110 may also store classification requirements associated with data retention policies. For example, policy repository 110 may store data retention policies for each dataset within the system that may require a dataset to remain stored on the system for a minimum of seven years. In this case, the classification requirement returned by metadata repository 112 may be for data retention, and policy repository 110 may store a data retention value of seven years for a respective dataset.

Metadata repository 112 may include a repository of data attributes and classification requirements associated with datasets that may be utilized by data environment(s) 116. Metadata repository may include a computer system configured to receive communications from classification management device 118 via, for example, API calls, or any other type or format of electronic communication. Information stored in metadata repository 112 may be accessed (e.g., retrieved, updated, and added to) via local network 114 (and/or network 106) by one or more devices (e.g., classification management device 118 and/or data environment(s) 116) of system 100. According to some embodiments, metadata repository 112 may store a plurality of different attributes associated with datasets stored in data environment(s) 116 including a dataset ID, which may be a number that uniquely identifies each dataset in system 100. Metadata repository 112 may additionally store a plurality of data attributes and a plurality of classification requirements for each dataset stored in the system. Data attributes may include a classification associated with the type of information found in a respective dataset. For example, data attributes may represent what kind of data is stored in a particular dataset, such as Payment card industry data, non-public information, human identifiable data, health industry (e.g., HIPAA) data, and general/unclassified data. Data attributes may also include a classification of each data entry in the dataset. For example, each entry in a given dataset may be classified as one of an account ID, an account identifier, a plastic number, a PAN number, a plastic account number, a social security number, etc. Metadata repository 112 may also include data indicative of which data attributes may include a classification requirement, as described in the paragraph below. Additionally, metadata repository may include audit information, such as a date when a particular record was created in metadata repository 112, a creation ID indicating a user that created the record in metadata repository 112, an update date which indicates the last time a record was updated in metadata repository 112, and an update ID which represents the identity of a user that last updated the entry in metadata repository 112.

Metadata repository 112 may also store classification requirements. For each given data entry in the dataset, the classification requirements may include an indication of what policy should be applied to a given dataset for a respective data environment 116. Each data environment 116 may have different policies that should be applied, even to the same or similar data entries of a dataset. For example, a first dataset copied to a production data environment may include different data policies than the same dataset when copied to a quality assurance data environment. Classification requirements may include data tokenization and data masking, according to what kind of data environment the dataset is copied to. According to some embodiments, metadata repository 112 may store a plurality of policy IDs associated with each respective data environment 116. Metadata repository 112 may return classification requirements based on an input of a dataset ID, which uniquely identifies a respective dataset, and a policy ID, which uniquely identifies the data environment 116 on which a dataset is stored. This allows classification requirements to be both dataset specific and data environment specific.

The local network 114 may include any type of computer networking arrangement used to exchange data in a localized area, such as WiFi, Bluetooth™ Ethernet, and other suitable network connections that enable components of system 100 to interact with one another and to connect to the network 106 for interacting with components in system 100 environment. In some embodiments, local network 114 may include an interface for communicating with or linking to the network 106. In other embodiments, certain components of the system 100 may communicate via the network 106, without a separate local network 114.

In accordance with certain example implementations of the disclosed technology, classification management device 118, which is described more fully below with reference to FIG. 2, may include one or more computer systems configured to compile data from a plurality of sources, such as policy repository 110, metadata repository 112, data environment(s) 116, compliance management database 120, and/or third-party database 122. Classification management device 118 may correlate complied data, analyzed the compiled data, arrange the complied data, generate derived data based on the complied data, and store the compiled and derived data in a database (e.g., policy repository 110, metadata repository 112, compliance management database 120, and/or database 260, as described in more detail with respect to FIG. 2). According to some embodiments, database 260 may be a database associated with organization 108 that stores a variety of information relating to the datasets stored on data environments 116.

In certain example implementations, the classification management device 118 may include one or more computer systems configured to execute one or more application program interfaces (APIs) that provide various functionalities related to the operations of the system 100. In some embodiments, classification management device 118 may include API adapters that enable classification management device 118 to interface with and utilize enterprise APIs maintained by an organization (e.g., organization 108) and/or an associated entity that may be housed on other systems or devices (e.g., third-party database 122). In some embodiments, APIs can provide functions that include, for example, retrieving datasets, modifying datasets to conform to a classification requirement, executing code on a dataset to conform to the classification requirement, and any other such function related to the management of datasets to conform to classification requirements by applying automated application of code arguments to datasets stored in data environment(s) 116. Classification management device 118 may include one or more processors and one or more databases, which may be any suitable repository of API data. Information stored in classification management device 118 may be accessed (e.g., retrieved, updated, and added to) via the local network 116 (and/or network 106) by one or more devices of system 100.

In certain embodiments, real-time APIs consistent with certain disclosed embodiments may use Representational State Transfer (REST) style architecture, and in this scenario, the real time API may be called a RESTful API. According to some embodiments real-time APIs consistent with certain disclosed embodiments may use a framework such as gRPC to facilitate a remote procedure call framework that can run in any data environment.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, data environment(s) 116) to exchange data with a system that implements the API (such as, for example, classification management device 118), in a request-response pattern. In certain embodiments, the request-response pattern defined by the API may be configured in a synchronous fashion and may require that the response be provided in real-time. In some embodiments, a response message from the server to the client through the API consistent with the disclosed embodiments may be in formats including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). In certain example implementations, the client may send GET and POST requests with JSON serialized parameters in the body. Preferably, the requests with JSON serialized parameters use "application/json" content-type. In another aspect, an API design may also require the server implementing the API return messages in JSON format in response to the request calls from the client.

According to some embodiments, compliance management database 120 may store permissions provided by a user (e.g., data steward) of system 100 to automatically modify one or more datasets according to a classification requirement. Accordingly, in some embodiments, before compliance management device 118 transmits instructions to a data environment 116 to modify a dataset to comply with a classification requirement, compliance management device 118 may first parse compliance management database 120 for a data entry indicative of permission to modify the respective dataset. Users of system 100 may include permissioned users responsible for any modifications to a dataset housed on one of data environment(s) 116. A permissioned user may upload a data entry indicating authorization for classification management device 118 to automatically modify a dataset housed in data environment(s) 116 to conform to one or more classification requirements.

Although described in the above embodiments as being performed by policy repository 110, metadata repository 112, data environment(s) 116, classification management device 118, and/or compliance management database 120, some or all of those functions may be carried out by a single computing device.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

Figure 2:
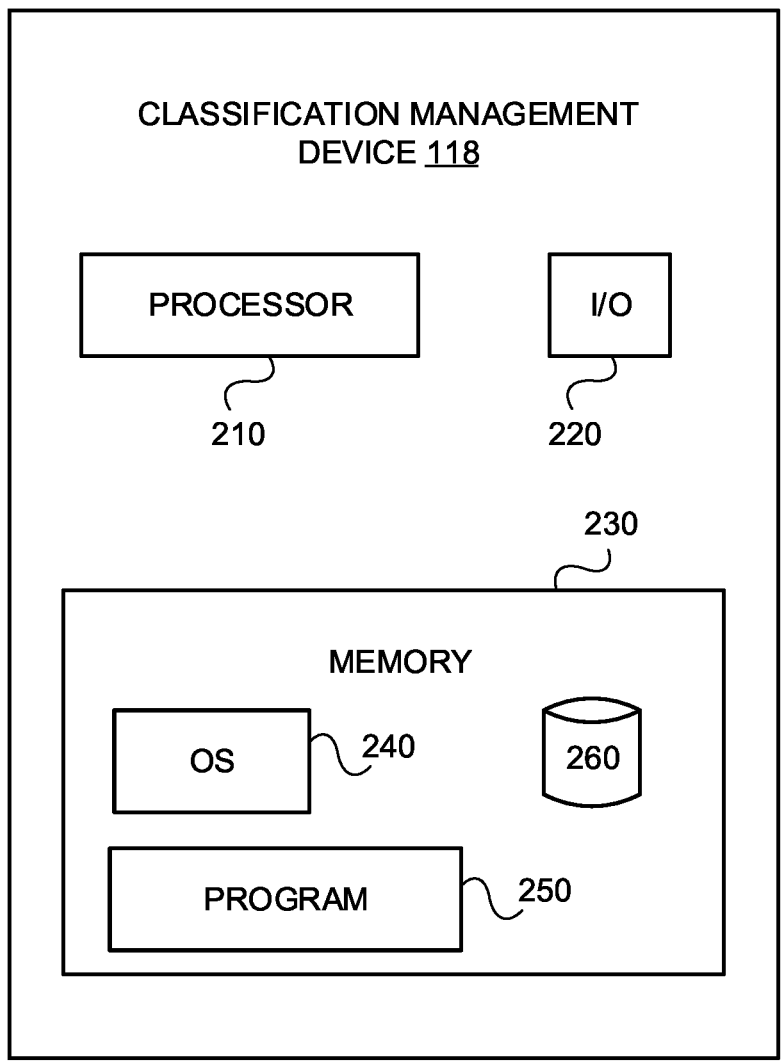
FIG. 2 is a block diagram of an example classification management device, in accordance with certain embodiments of the disclosed technology.

FIG. 2 is a block diagram (with additional details) of the example classification management device 118, as also depicted in FIG. 1. According to some embodiments, policy repository 110, metadata repository 112, data environment(s) 116, compliance management database 120, and/or third-party database 122, as depicted in FIG. 1, may have a similar structure and components that are similar to those described with respect to classification management device 118 shown in FIG. 2. As shown, the classification management device 118 may include a processor 210, an input/output ("I/O") device 220, a memory 230 containing an operating system ("OS") 240, a program 250, and a database 260. In certain example implementations, classification management device 118 may be a single server or may be configured as a distributed computer system including multiple servers or computers that interoperate to perform one or more of the processes and functionalities associated with the disclosed embodiments. In some embodiments, classification management device 118 may further include a peripheral interface, a transceiver, a mobile network interface in communication with the processor 210, a bus configured to facilitate communication between the various components of classification management device 118, and a power source configured to power one or more components of classification management device 118.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, classification management device may include one or more storage devices configured to store information used by the processor 210 (or other components) to perform certain functions related to the disclosed embodiments. In one example, classification management device 118 may include memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, classification management device 118 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, classification management device 118 may include memory 230 that may include one or more programs 250 to perform one or more functions of the disclosed embodiments. For example, in some embodiments, classification management device 118 may send instructions to modify datasets stored in data environment(s) 116 via a program 250.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by the processor 210, perform one or more processes consistent with the disclosed embodiments. In some embodiments, memory 230 may include a user information database 260 for storing related data to enable classification management device 118 to perform one or more of the processes and functionalities associated with the disclosed embodiments.

Database 260 may also serve as a back-up storage device and may contain data and information that is also stored on, for example, policy repository 110, metadata repository 112, compliance management database 120, and/or third-party database 122. Database 260 may be accessed by the classification management device 118 and may be used to store records of dataset classification requirements, data attributes, and classification codes associated with the datasets stored on data environment(s) 116.

Classification management device 118 may also be communicatively connected to one or more memory devices (e.g., databases) locally or through a network. The remote memory devices may be configured to store information and may be accessed and/or managed by classification management device 118. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Classification management device 118 may also include one or more I/O devices 220 that may comprise one or more interfaces for receiving signals or input from devices and providing signals or output to one or more devices that allow data to be received and/or transmitted by classification management device 118. For example, classification management device 118 may include interface components, which may provide interfaces to one or more input devices, such as one or more keyboards, mouse devices, touch screens, track pads, trackballs, scroll wheels, digital cameras, microphones, sensors, and the like, that enable classification management device 118 to receive data from one or more systems (such as, for example, data environment(s) 116).

In example embodiments of the disclosed technology, classification management device 118 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While classification management device 118 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of classification management device 118 may include a greater or lesser number of components than those illustrated.

Figure 3:
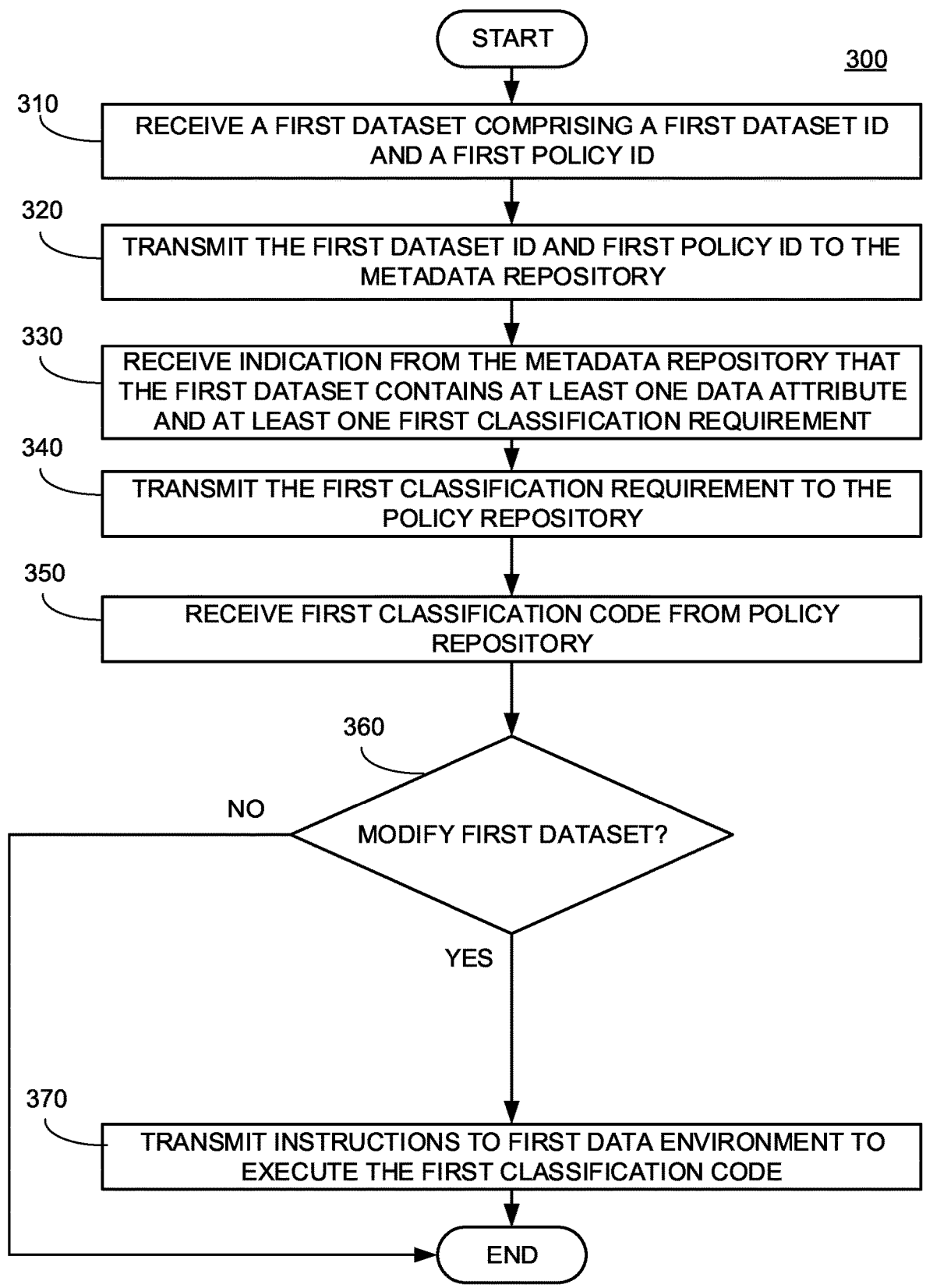
FIG. 3 is a flow diagram 300 illustrating examples of methods for modifying a dataset to conform to an existing classification requirement, in accordance with certain embodiments of the disclosed technology.

FIG. 3 is a flow diagram 300 illustrating examples of methods for modifying a dataset to conform to an existing classification requirement, in accordance with certain embodiments of the disclosed technology. As shown in FIG. 3, in step 310, classification management device (e.g., classification management device 118) may receive a first dataset. The first dataset may be stored on a first data environment. Based on the respective data environment, the first dataset may include a first policy ID. The policy ID may be dependent on the type of data environment. For example, a production data environment may have a policy ID that requires data masking for sensitive data entries, whereas a quality assurance data environment may have a policy ID that only requires anonymization for sensitive data entries. The first dataset may also include a first dataset ID. The Classification management device may use the first dataset ID and the first policy ID to determine data attributes and associated classification requirements for all data entries in the first dataset.

In step 320, the system (e.g., via classification management device 118) may transmit the first dataset ID and the first policy ID to a metadata repository (e.g., metadata repository 112). Metadata repository may store the first dataset ID, first policy ID, as well as related attributes, as described in more detail with respect to FIG. 1. Accordingly, the classification management device 118 may parse the associated data entries in the metadata repository to determine data attributes and classification requirements associated with each data entry in the first dataset based on the specific dataset and the data environment associated with the dataset.

In step 330, the system (e.g., classification management device 118) may receive an indication from the metadata repository that the first dataset contains at least one data attribute and at least one first classification requirement. For example, each data entry in the dataset may include a correlated entry in the metadata repository that identifies the dataset, the respective data entry, and the data attribute of the given data entry. For each data attribute, the metadata repository also contains at least one classification requirement. According to some embodiments, the classification requirement is based on both the data attribute of the given data entry, as well as the data environment which houses the respective dataset (e.g., based on the policy ID passed to metadata repository). For example, a production data environment may include classification requirements that are different than for the same dataset in a quality assurance data environment.

Once the at least one classification requirement is received from the metadata repository, the system (e.g., classification management device 118) may transmit the first classification requirement to the policy repository in step 340. In step 350, the system (e.g., classification management device 118) may receive first classification code from the policy repository. For example, when the classification requirement is for data tokenization for a given entry in the first dataset, the policy repository may return approved standardized code arguments for data tokenization. For example, the approved commands for data tokenization may include turing.tokenize and/or voltage.tokenize which may be returned by policy repository. According to some embodiments, and as described in more detail with respect to FIG. 9, the system may be configured to accept new standardized code arguments or modify existing standardized code arguments.

In decision block 360, the system may determine whether the first dataset needs to be modified to conform to the classification requirement. Returning to the data tokenization example, the system may determine that the data entries have already been tokenized according to the classification requirement for tokenization. Accordingly, method 300 may end. When the system determines that the data entries do not conform to the classification requirement, the system (e.g. classification management device 118) may transmit instructions to the first data environment to execute the first classification code in step 370. In the data tokenization example, the first classification code (e.g., the turing.tokenize and/or voltage.tokenize) may be automatically applied to each data entry in the dataset that requires tokenization as its classification requirement. After step 370, method 300 may end. According to some embodiments, before the classification code is automatically applied to each data entry in the dataset, the system may first query a compliance management database for permissions from a permissioned user of the first dataset. The permissioned user may be responsible for all changes made to the dataset, and in some embodiments, may need to provide manual permission in an entry in the compliance management database before the system automatically applies the classification code to the dataset.

Figure 4:
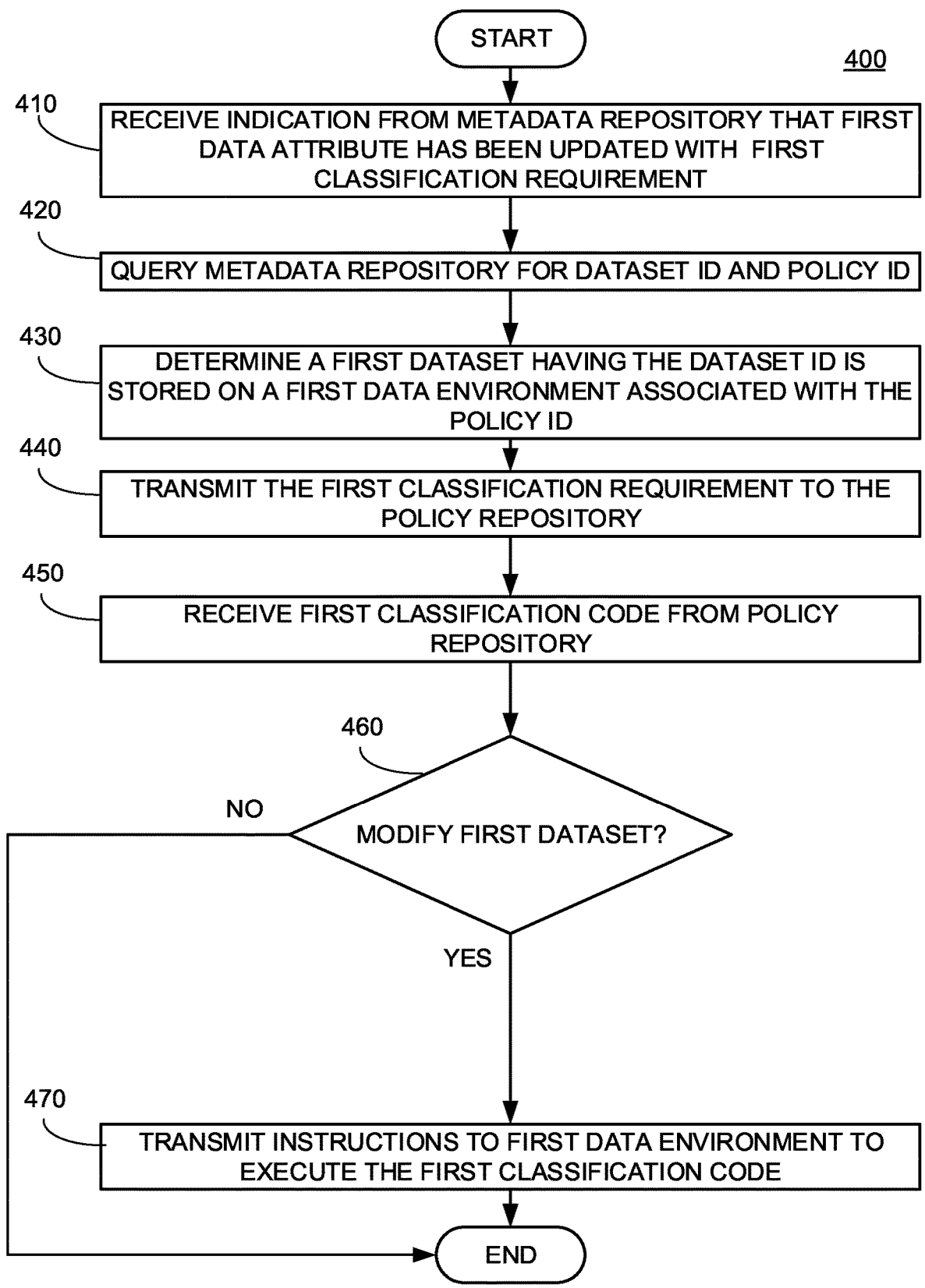
FIG. 4 is a flow diagram 400 illustrating examples of methods for modifying a dataset to conform to an updated classification requirement, in accordance with certain embodiments of the disclosed technology.

FIG. 4 is a flow diagram 400 illustrating examples of methods for modifying a dataset to conform to an updated classification requirement, in accordance with certain embodiments of the disclosed technology. As shown in FIG. 4, in step 410 of method 400 the system (e.g., classification management device 118) may receive an indication from a metadata repository (e.g., metadata repository 110) that a first data attribute has been updated with a first classification requirement. For example, the first data attribute may be for HIPAA compliant data. A new government regulation for HIPAA data may have passed, which requires data masking for any HIPAA data in a production (e.g., public) data environment, and data tokenization for any data environment that is used internally by an organization (e.g., a quality assurance data environment). Accordingly, the metadata repository may be updated to include data masking as the classification requirement for datasets having the respective data attribute and a policy ID associated with a production data environment, and data tokenization as the classification requirement for datasets having the respective data attribute and a policy ID associated with a quality assurance data environment. In another example, a new government regulation may pass that requires a previously unprotected data attribute to be reclassified to a protected data attribute that requires tokenization. For example, the new regulation may reclassify a passport number as requiring the application of a data governance policy, when previously no data governance policy was set in place. Accordingly, the metadata repository may be updated with a new classification requirement for the data attribute for each possible policy ID (e.g., depending on what kind of data environment the data attribute is stored on). Because the classification code does not change, only metadata repository need be updated to include the data attributes (e.g., passport number) affected by the new regulation, and the standardized code arguments stored in the policy repository may be unchanged.

In step 420, the system (e.g., classification management device 118) may query a metadata repository (e.g., metadata repository 110) for a dataset ID and a policy ID. The metadata repository may return one or more dataset IDs for any dataset that includes data attributes (e.g. HIPAA data) that must conform to the new classification requirement (e.g., data masking and/or tokenization) as well as policy IDs associated with a data environment on which the dataset is stored. Accordingly, in step 430, the system (e.g., classification management device 118) may determine a first dataset having the dataset ID that is stored in a first data environment associated with the policy ID. As discussed above, the type of data environment may determine the classification requirement.

In step 440, the system may transmit the first classification requirement to the policy repository. For example, when the dataset is stored in a public facing data environment, such as a production environment, the classification requirement transmitted to the policy repository may be for data masking. If the dataset is stored in a non-production environment, the classification requirement transmitted to the policy repository may be for data tokenization.

In step 450, the system may receive first classification code from the policy repository. As discussed with respect to step 440, depending on the type of data environment in which the dataset is stored, the classification code may be standardized code arguments for either data masking or data tokenization.

In decision block 460, the system (e.g., classification management device 118) may determine whether the first dataset needs to be modified. For example, the system may determine that each data attribute in the first dataset already meets the classification requirement (e.g., in a production environment, all HIPAA references may already be anonymized). When the system determines that the first dataset does not need modification (e.g., when the first dataset already conforms to the classification requirement) method 400 may end. When the system determines that the first dataset does need to be modified (e.g., when the first dataset does not conform to the classification requirement), method 400 may move to step 470.

In step 470, the system (e.g., classification management device 118) may transmit instructions to the first data environment to execute the first classification code. As described in more detail with respect to FIG. 1, when the data environment is a client facing environment, the policy repository may return standardized code arguments for data masking (e.g., faker.fake, synthesizer.scrub, and/or TDM.scrub). When the data environment is not a client facing environment, but configured for internal use within the organization (e.g., organization 108), the policy repository may return standardized code arguments for data tokenization (e.g., the turing.tokenize and/or voltage.tokenize). Accordingly, the standardized code arguments are automatically applied to each entry in the dataset that includes the classification requirement. According to some embodiments, before the classification code is automatically applied to each data entry in the dataset, the system may first query a compliance management database for permissions from a permissioned user of the first dataset. The permissioned user may be responsible for all changes made to the dataset, and in some embodiments, may need to provide manual permission in an entry in the compliance management database before the system automatically applies the classification code to the dataset.

Figure 5:
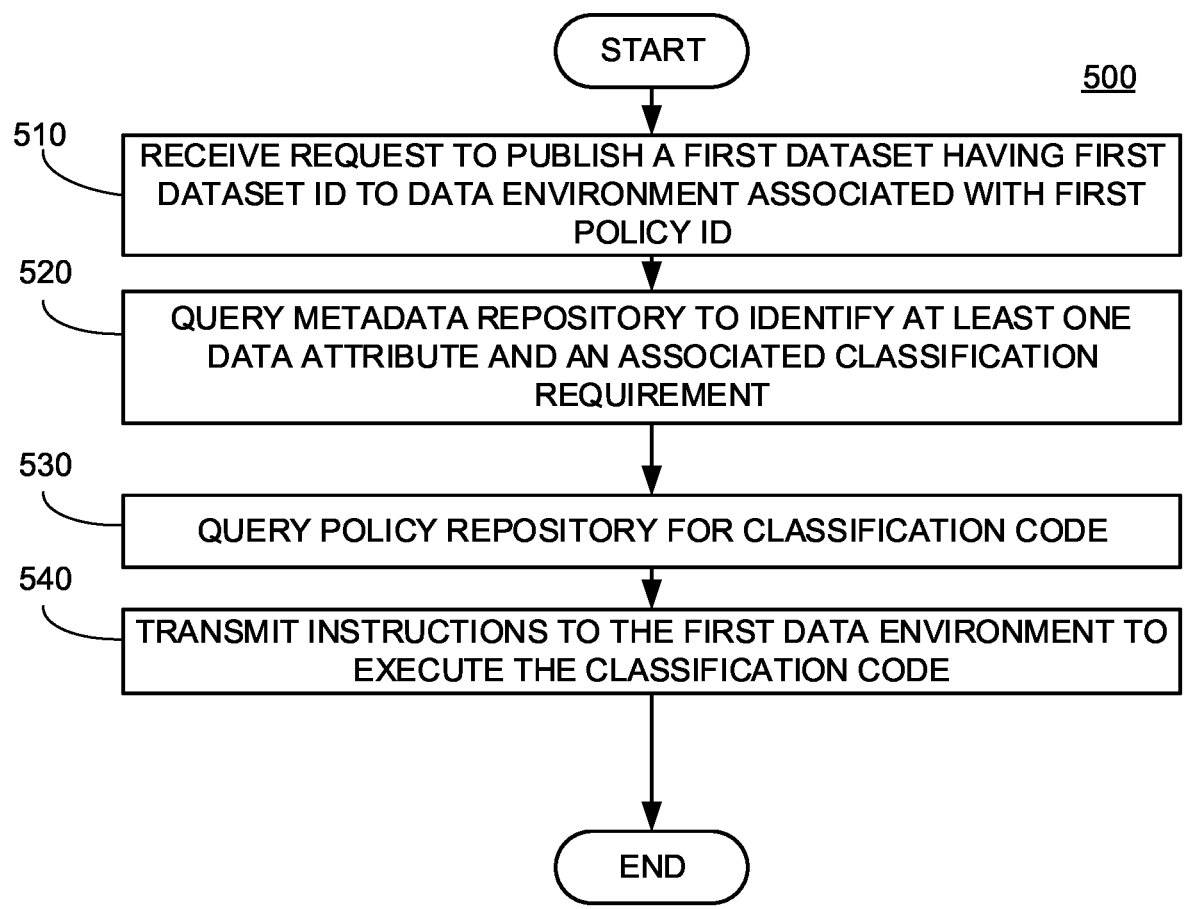
FIG. 5 is a flow diagram 500 illustrating another exemplary method for modifying a dataset to conform to a classification requirement, in accordance with certain embodiments of the disclosed technology.

FIG. 5 is a flow diagram 500 illustrating another exemplary method for modifying a dataset to conform to a classification requirement, in accordance with certain embodiments of the disclosed technology. As shown in FIG. 5, in step 510 of method 500 the system (e.g., classification management device 118) may receive a request to publish a first dataset having a first dataset ID to a data environment associated with a first policy ID. For example, the first dataset may be received by the system from a third-party database (e.g., third-party database 122). According to some embodiments, the dataset having the first dataset ID may be copied to a public-facing data environment or a data environment closed to just the organization (e.g., organization 108), and depending on which data environment the dataset is placed on will have a different associated policy ID. Based on the target data environment, and the contents of the first dataset, the system may query the metadata repository to identify at least one data attribute and an associated classification requirement for the first dataset in step 520. As discussed with respect to FIG. 3 and FIG. 4, the data attribute may be associated with a data type present in the dataset, and the classification requirement for each data entry may be based on the data type present in the dataset as well as the data environment that the dataset is to be copied to (e.g., public-facing data environment vs. data environment open only to organization 108).

After receiving the at least one data attribute and an associated classification requirement, the system (e.g., classification management device 118) may query the policy repository for the relevant classification code in step 530. For example, the classification requirement may be for data tokenization for data entries having data attributes related to HIPAA data, SSN data entries, credit card numbers, etc. when the data environment is a private data environment accessible only to members of organization 108. Conversely, the classification requirement may be for data masking when the data environment is a public-facing data environment.

In step 540, the system may transmit instructions to the first data environment to execute the classification code. For example, when the data environment is public facing, the classification code may be for data masking. The system may return standardized code arguments for data masking (e.g., faker.fake, synthesizer.scrub, and/or TDM.scrub). When the data environment is not a client facing environment, but configured for internal use within the organization (e.g., organization 108), the policy repository may return standardized code arguments for data tokenization (e.g., the turing.tokenize and/or voltage.tokenize). Accordingly, the standardized code arguments are automatically applied to each entry in the dataset that includes the classification requirement. According to some embodiments, before the classification code is automatically applied to each data entry in the dataset, the system may first query a compliance management database for permissions from a permissioned user of the first dataset. The permissioned user may be responsible for all changes made to the dataset, and in some embodiments, may need to provide manual permission in an entry in the compliance management database before the system automatically applies the classification code to the dataset.

Figure 6:
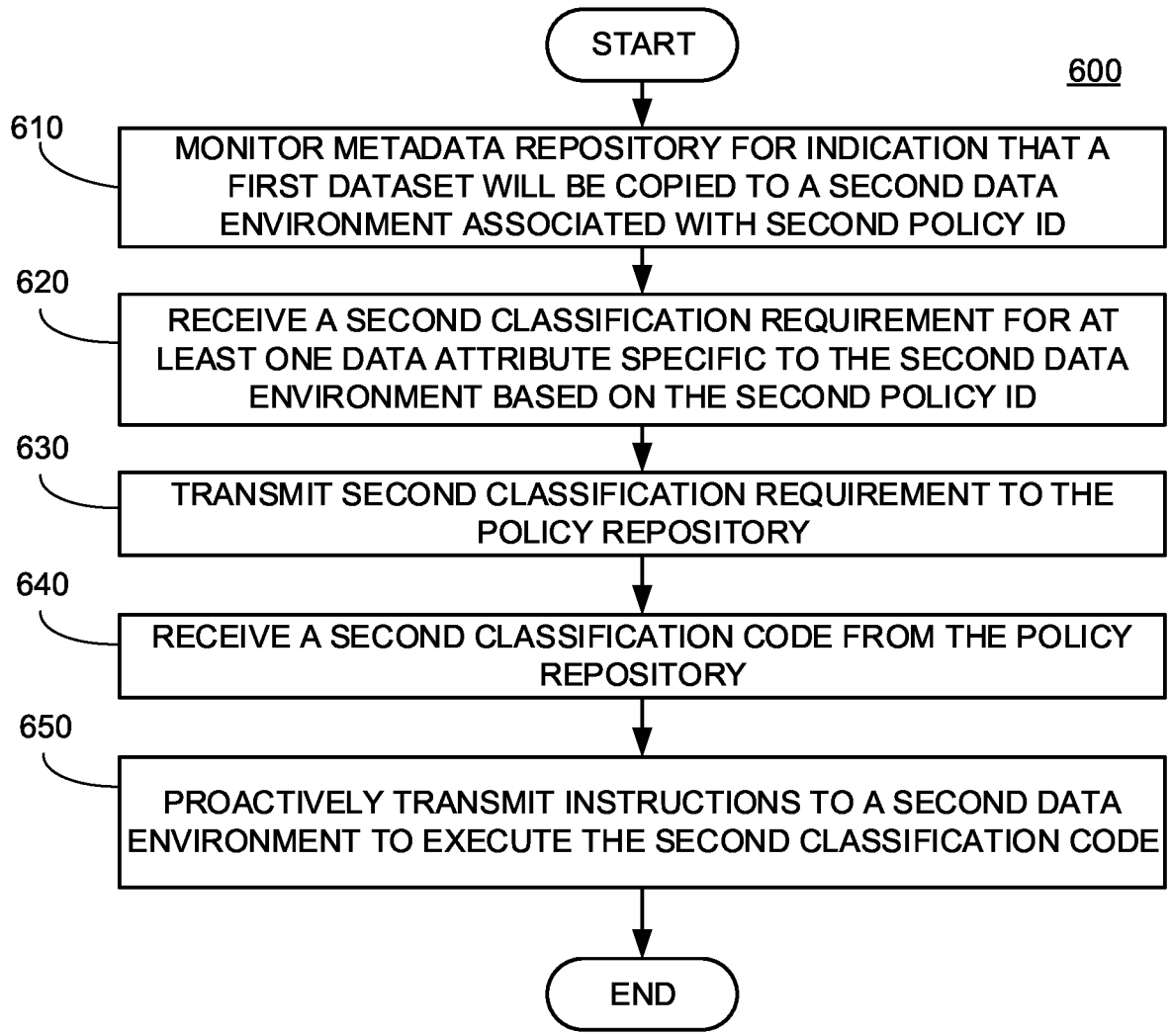
FIG. 6 is a flow diagram 600 illustrating an exemplary method for proactively transmitting instructions to a second data environment to modify a dataset to conform to a classification requirement specific to the second data environment, in accordance with certain embodiments of the disclosed technology.

FIG. 6 is a flow diagram 600 illustrating an exemplary method for proactively transmitting instructions to a second data environment to modify a dataset to conform to a classification requirement specific to the second data environment, in accordance with certain embodiments of the disclosed technology. As shown in FIG. 6, in step 610 of method 600 the system (e.g., classification management device 118) may monitor the metadata repository for an indication that a first dataset will be copied to a second data environment associated with a second policy ID. As discussed with respect to FIGS. 3-5, classification requirements for respective data entries in a dataset may be based on what type of data entry is in the dataset (e.g., the data attribute of the data entry) as well as what data environment the dataset is stored on. For example, the first dataset may be initially stored on a first data environment that is open only to members of the organization (e.g., organization 108) and the second data environment may be a public-facing data environment.

In step 620, the system (e.g., classification management device 118) may receive a second classification requirement for at least one data attribute specific to the second data environment based on the second policy ID. For example, the dataset may include one of a social security number, a credit card number, HIPAA related medical information, etc. as the data attribute. The metadata repository may return a classification requirement for masking for any data entry that includes the data attribute associated with a sensitive data entry in the first dataset based on the policy ID being associated with a data environment that requires data masking as the classification requirement for sensitive data entries. In step 630, the system may transmit the second classification requirement to the policy repository. In step

640, the system may receive second classification code form the policy repository. The policy repository may return standardized code arguments for data masking (e.g., faker.fake, synthesizer.scrub, and/or TDM.scrub). Accordingly, the standardized code arguments are automatically applied to each entry in the dataset that includes the data attribute. According to some embodiments, before the classification code is automatically applied to each data entry in the dataset, the system may first query a compliance management database for permissions from a permissioned user of the first dataset. The permissioned user may be responsible for all changes made to the dataset, and in some embodiments, may need to provide manual permission in an entry in the compliance management database before the system automatically applies the classification code to the dataset.

In step 650, before the dataset is copied to the second (e.g., public-facing) data environment, the system may proactively transmit instructions to the second data environment. For example, based on the data environment being a public-facing data environment, the classification code received from the policy repository may be associated with data masking. The system may transmit the standardized code arguments (e.g., faker.fake, synthesizer.scrub, and/or TDM.scrub) to the second data environment. When the dataset is copied to the second data environment, the classification code may be automatically executed for each data entry having the data attribute associated with the classification requirement.

Figure 7:
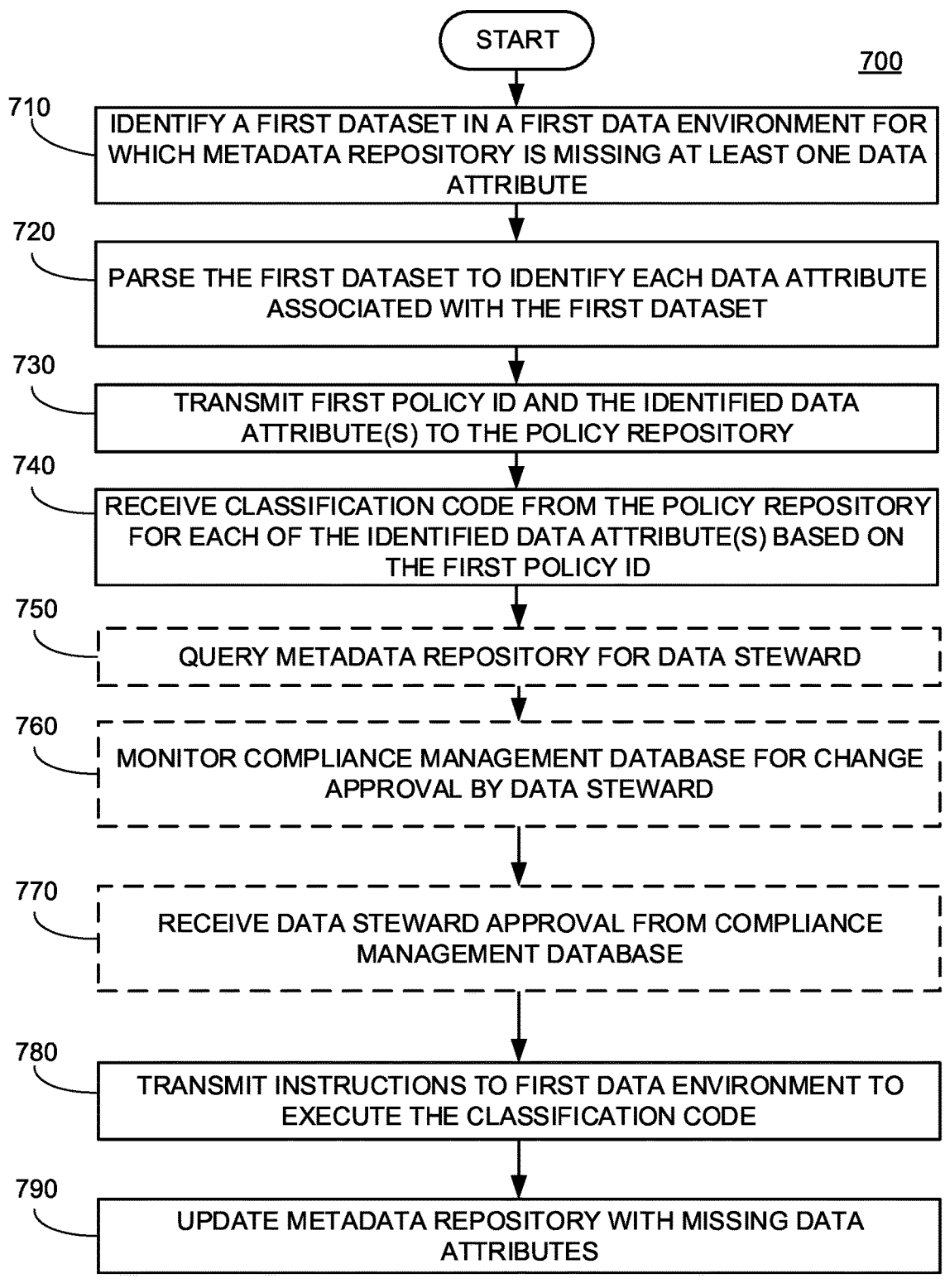
FIG. 7 is a flow diagram 700 illustrating an exemplary method for identifying a deficient dataset and modifying the deficient dataset to conform to a classification requirement, in accordance with certain embodiments of the disclosed technology.

FIG. 7 is a flow diagram 700 illustrating an exemplary method for identifying a deficient dataset and modifying the deficient dataset to conform to a classification requirement. As shown in FIG. 7, in step 710, the system may identify a first dataset in a first data environment for which the metadata repository is missing at least one data attribute. For example, dataset A may be stored on a first data environment, and may have attributes (e.g., a customer identification number) that have not been included in the metadata repository 112. In step 720, the system may parse the first dataset to identify each data attribute associated with the first dataset. For example, classification management device 118 may access the first dataset and search the dataset column by column to identify every attribute present in the dataset. Each attribute may be compared to attributes stored in metadata repository 112 (e.g., based on querying metadata repository 112 with the dataset ID of dataset A and comparing the listed data attributes in metadata repository 112 with those found by the scan performed by classification management device 118). The classification management device 118 may also determine a policy ID associated with the dataset based on the data environment on which the respective dataset is stored. After the missing data attributes have been identified, the system (e.g., classification management device 118) may transmit the policy ID and the identified missing data attributes to policy repository 110.

In step 740, responsive to transmitting the data attributes and policy ID to policy repository 110, the system (e.g., classification management device 118) may receive classification code from policy repository 110 for each of the identified data attributes. The data attributes may be stored by policy repository 110 and based on the transmitted policy ID, policy repository 110 may return classification code to be applied to each of the identified data attributes. For example, if the data environment is public facing the classification code for the missing data attribute "customer identification number" may be a standardized code argument for data masking (e.g., synthesizer.scrub, TDM.scrub, and/or faker.fake).

In optional step 750, the system (e.g., classification management device 118) may query metadata repository 112 to determine the data steward (e.g., the permissioned user associated with the dataset) for the respective dataset that included the missing data attributes. In optional step 760, the system (e.g., classification management device 118) may monitor compliance management database 120 for change approval by the data steward. In optional step 770, the system may receive data steward approval from compliance management database 120. After receiving approval, the system may execute the classification code on the respective dataset and update the metadata repository with the missing data attributes.

In step 780, the system (e.g., classification management device 118) may transmit instructions to the first data environment to execute the classification code. Accordingly, each identified missing data attribute will automatically have standardized code arguments applied to conform with the classification requirements for each specific data attribute based on the policy ID associated with the dataset (e.g., based on what type of data environment the respective dataset is stored on). In step 790, the system (e.g., classification management device 118) may update metadata repository 112 with the missing data attributes. Accordingly, the entries in policy repository 110 may be used to update metadata repository 112 with the missing data attributes.

Figure 8:
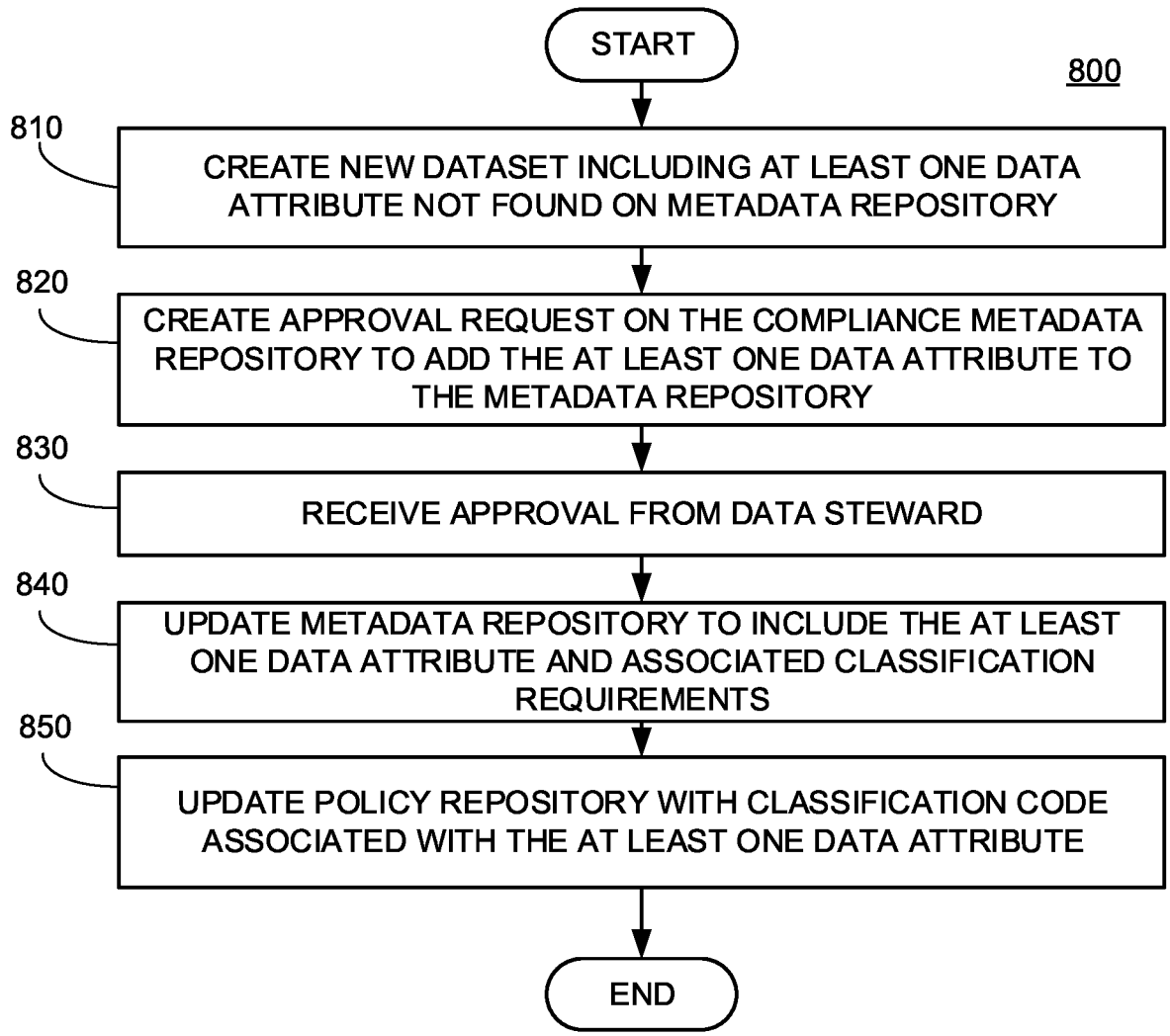
FIG. 8 is a flow diagram 800 illustrating an exemplary method for identifying a new data attribute and updating a policy repository, in accordance with certain embodiments of the disclosed technology.

FIG. 8 is a flow diagram 800 illustrating an exemplary method for identifying a new data attribute and updating a policy repository. As shown in FIG. 8, in step 810, a user of the system may create a new dataset including at least one data attribute not found on the metadata repository. For example, the new dataset may be created by a user of the system (e.g., by a permissioned data steward) or the dataset may be received from a third-party source (e.g., third-party database 122). The new dataset may include data attributes that are not previously stored on metadata repository 112. In step 820, the system (e.g., classification management device 118) may create an approval request on compliance management database 120 to add the at least one data attribute to metadata repository 112. According to some embodiments, additional creation of data entries on metadata repository 112 may be requested, such as an entry for a new dataset ID, and classification requirements associated with the new dataset ID for each policy ID (e.g., data environment) available to the system. Accordingly, metadata repository 112 may be updated with data attributes and classification requirements for each data context (e.g., dependent on the data environment) for the new dataset. In step 830, the system (e.g., classification management device 118) may receive an approval from the data steward. For example, classification management device 118 may detect when the data steward has approved the approval request on compliance management database 120. After receiving approval from the data steward, the system may update metadata repository 112 to include the at least one data attribute and the associated classification requirements in step 840. As explained above, classification requirements may be dependent on the respective data attribute as well as the context (e.g., policy ID) associated with the data environment on which the dataset is stored. For example, a classification requirement for a data attribute on a public facing data environment may require data masking or anonymization, while a classification requirement for the same data attribute on an internal data environment may only call for data tokenization. In step 850, the system may update the policy repository 110 to include the classification code associated with the new data attributes. According to some embodiments, new data attributes are not previously stored on policy repository, and accordingly, the policy repository 110 must be updated to include classification code associated with the new data attributes. In some embodiments, classification code from other data attributes may be applied if the classification requirements associated with the other data attributes matches the classification requirements for the at least one data attribute not previously found on metadata repository 112. In other embodiments, the system may require new classification code to be added to policy repository 112, for example, if no previously stored classification code matches the classification requirements associated with the new data attribute not previously found on metadata repository.

Figure 9:
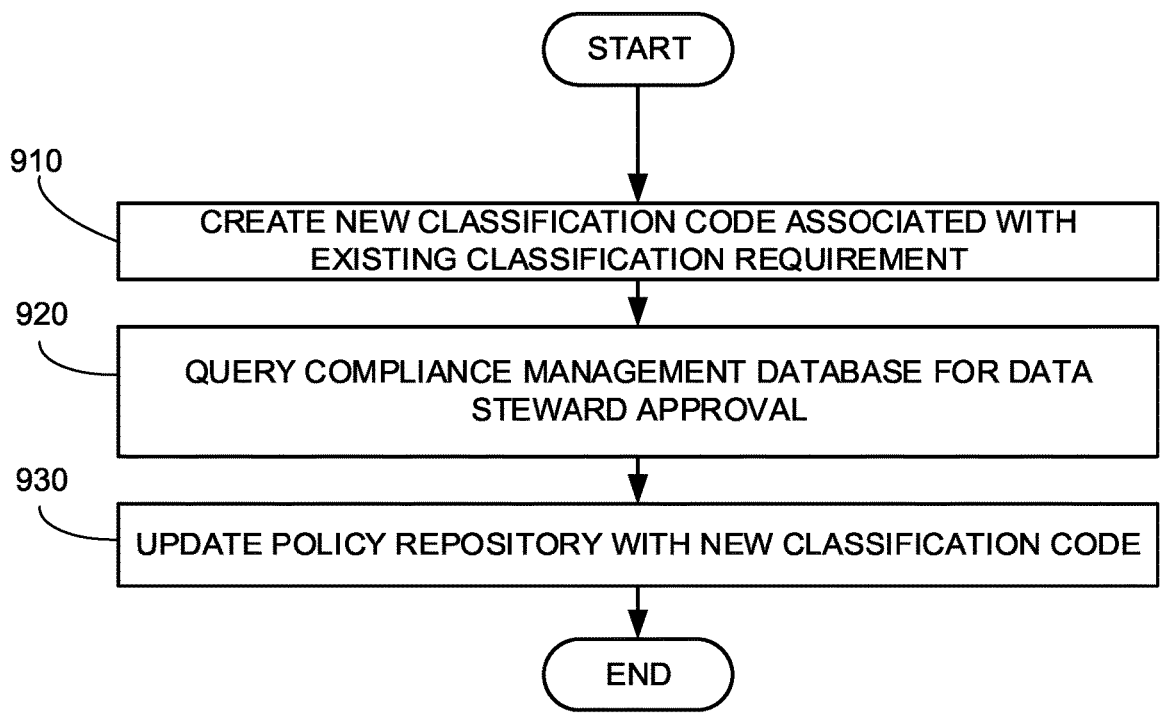
FIG. 9 is a flow diagram 900 illustrating an exemplary method for approving new classification code for a respective classification requirement and updating a policy repository, in accordance with certain embodiments of the disclosed technology.

FIG. 9 is a flow diagram 900 illustrating an exemplary method for approving new classification code for a respective classification requirement and updating a policy repository. As shown in FIG. 9, in step 910, the system may create a new classification code associated with an existing classification requirement. For example, a permissioned user or data steward may determine that a new method for data anonymization should be added to policy repository 110. Accordingly, in step 920, the system (e.g., classification management device 118) may query compliance management database 120 for approval from the data steward. In some embodiments, querying compliance management database 120 for approval may include receiving secondary approval from a data steward reviewer, that provides a second review of the classification code proposed to be added to policy repository. In step 930, after determining that data steward and secondary reviewer have provided approval for the newly proposed classification code, the system (e.g., classification management device 118) may update policy repository 110 with the new classification code. For example, a new method for data anonymization "anonymize.xyz" may be added as an approved standardized code argument to be applied to data attributes having data anonymization as its classification requirement.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultramobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Examples of the present disclosure relate to systems and methods for enforcing automated data governance. In one aspect, a system is disclosed. The system may implement a method according to the disclosed embodiments. The system may include one or more processors, a plurality of production environments, a metadata repository storing a plurality of data attributes and a plurality of classification requirements, a policy repository, one or more processors, and a memory in communication with the one or more processors. The system may receive a first data set from a first production environment. The first dataset may include a first dataset ID. The system may transmit the first dataset ID to the metadata repository. The system may receive an indication from the metadata repository that the first dataset contains at least one data attribute and at least one first associated classification requirement. The system may transmit the at least one first classification requirement to the policy repository. The system may receive a first classification code associated with the at least one first classification requirement from the policy repository. Responsive to receiving the first classification requirement, the system may modify the first dataset by transmitting instructions to the first production environment to execute the first classification code responsive to receiving the classification code from the policy repository.

In some embodiments, the system may monitor the metadata repository for an indication that the first dataset will be copied to a second production environment. The system may receive a second classification requirement for at least one data attribute specific to the second production environment. The system may transmit the second classification requirement to the policy repository. The system may receive a second classification code associated with the second classification requirement from the policy repository. The system may proactively transmit instructions to a second production environment to execute the second classification code.

In some embodiments, the system may receive an indication from the metadata repository that the first dataset has been copied to a second production environment. The system may receive a second classification requirement for at least one data attribute specific to the second production environment. The system may transmit the second classification requirement to the policy repository. The system may receive a second classification code associated with the second classification requirement from the policy repository. The system may transmit instructions to the second production environment to execute the second classification code.

In some embodiments, may further include a compliance management database, wherein modifying the first dataset is based on receiving an indication that the first classification code has been verified from the compliance management database. In some embodiments, each classification requirement of the plurality of classification requirements is specific to a respective production environment of the plurality of production environments. In some embodiments, each classification code is stored on the policy repository and further includes a standardized code argument to be applied to a respective data attribute. In some embodiments, the system may monitor each of the plurality of production environments for a second dataset. The system may identify a second dataset associated with a third production environment having a second dataset ID. The system may transmit the second dataset ID to the metadata repository. The system may receive an indication from the metadata repository that the second dataset contains at least one data attribute and at least one second associated classification requirement. The system may transmit the at least one second classification requirement to the policy repository. The system may receive a second classification code associated with the at least one second classification requirement from the policy repository. The system may modify the second dataset by transmitting instructions to the third production environment to execute the second classification code.

In another aspect, a system is disclosed. The system may include a plurality of production environments, a metadata repository storing a plurality of data attributes and a plurality of classification requirements. The system may include a policy repository, one or more processors, and a memory in communication with the one or more processors. The system may receive an indication from the metadata repository that a first data attribute has been updated to include a first classification requirement. The system may query the metadata repository for a dataset ID associated with a dataset including the first data attribute. The system may determine that a first dataset having the dataset ID is stored on a first production environment of the plurality of production environments. The system may transmit the first classification requirement to the policy repository. The system may receive a first classification code associated with the first classification requirement. The system may modify the first dataset by transmitting instructions to the first database to execute the first classification code.

In some embodiments, the system may monitor the metadata repository for an indication that the first dataset will be copied to a second production environment. The system may receive a second classification requirement for the at least one data attribute specific to the second production environment. The system may transmit the second classification requirement to the policy repository. The system may receive a second classification code associated with the second classification requirement from the policy repository. The system may proactively transmit instructions to a second production environment to execute the second classification code.

In some embodiments, the system may receive an indication from the metadata repository that the first dataset has been copied to a second production environment. The system may receive a second classification requirement for at least one data attribute specific to the second production environment. The system may transmit the second classification requirement to the policy repository. The system may receive a second classification code associated with the second classification requirement from the policy repository. The system may modify the first dataset by transmitting instructions to the second production environment to execute the second classification code.

In some embodiments, the system may include a compliance management database, wherein modifying the first dataset is based on receiving an indication that the first classification code has been verified from the compliance management database. In some embodiments, each classification requirement of the plurality of classification requirements is specific to a respective production environment of the plurality of production environments. In some embodiments, each classification code is stored on the policy repository and further includes a standardized code argument to be applied to respective data attribute.

In some embodiments, the system may monitor each of the plurality of production environments for a second dataset. The system may identify a second dataset associated with a third production environment having a second dataset ID. The system may transmit the second dataset ID to the metadata repository. The system may receive an indication from the metadata repository that the second dataset contains at least one data attribute and at least one second associated classification requirement. The system may transmit the at least one second classification requirement to the policy repository. The system may receive a second classification code associated with the at least one second classification requirement from the policy repository. The system may modify the second dataset by transmitting instructions to the third production environment to execute the second classification code.

In some embodiments, the classification requirement may include at least one of a tokenization requirement and an anonymization requirement.

In another aspect a system is disclosed. The system may include a plurality of production environments, a metadata repository storing a plurality of data attributes and a plurality of classification requirements. The system may include a policy repository, one or more processors, and a memory in communication with the one or more processors. The system may receive a request to publish a first dataset having a first dataset ID to a first production environment. The system may query the metadata repository to identify at least one data attribute and an associated classification requirement for the first dataset based on the first dataset ID. The system may query the policy repository for classification code associated with the classification requirement. The system may modify the first dataset by transmitting instructions to the first production environment to execute the classification code.

In some embodiments, each classification requirement may include at least one of a tokenization requirement and an anonymization requirement. In some embodiments, each classification code is stored on the policy repository and may further include a standardized code argument to be applied to a respective data attribute. In some embodiments, each classification code may include a plurality of interchangeable standardized code arguments. In some embodiments, each classification requirement of the plurality of classification requirements is specific to a respective production environment of the plurality of production environments.

What is claimed is:
1. A system comprising:
 a classification management device comprising:
  one or more processors; and
  memory in communication with the one or more processors and storing instructions that, when executed by the one or more processors, are configured to cause the system to:
   identify a first dataset stored in a first data environment, among a plurality of data environments, for which a metadata repository is missing at least one data attribute;
   responsive to parsing the first dataset stored in the first data environment to identify one or more data attributes associated with the first dataset that are missing from the metadata repository, transmit a first policy identifier and the identified one or more data attributes to a policy repository;

store one or more standardized code arguments in the policy repository, wherein each of the one or more standardized code arguments apply a respective policy to a dataset stored in one of one or more data environments;

receive a classification code from the policy repository for each of the one or more identified data attributes based on the first policy identifier by receiving a list of approved standardized code arguments that can be automatically applied to a dataset, the classification code comprising a code argument of the one or more standardized code arguments to be automatically applied to a respective data attribute, wherein a first classification code received from the policy repository comprises a standardized code argument for data masking or tokenization;

transmit instructions to the first data environment to execute each classification code for each of the one or more identified data attributes to modify the first dataset in the first data environment; and update the metadata repository with missing data attributes.

2. The system of claim 1, wherein identifying one or more data attributes associated with the first dataset comprises identifying data attributes that are missing from the metadata repository by:

scanning the first dataset to identify every attribute associated with the first dataset; and comparing every attribute associated with the first dataset to a set of attributes stored in the metadata repository; and identifying attributes that are included in every attribute associated with the first dataset and that are not included in the set of attributes stored in the metadata repository.

3. The system of claim 2, wherein the set of attributes stored in the metadata repository is identified by querying the metadata repository with a dataset identifier of the first dataset.

4. The system of claim 1, wherein the instructions are configured to cause the system to:

determine the first policy identifier associated with the first dataset based on the first data environment.

5. The system of claim 1, wherein executing each classification code for each of the one or more identified data attributes causes each of the one or more identified data attributes to automatically have standardized code arguments applied to conform with classification requirements for each specific data attribute based on the first policy identifier.

6. The system of Claim 1, wherein entries in the policy repository are used to update the metadata repository with the missing data attributes.

7. A system comprising:
a plurality of data environments comprising at least a first data environment storing a first dataset;
a metadata repository storing a plurality of data attributes;
a policy repository; and
a classification management device comprising:
one or more processors; and
memory in communication with the one or more processors and storing instructions that, when executed by the one or more processors, are configured to cause the system to:

identify the first dataset stored in the first data environment for which the metadata repository is missing at least one data attribute;

responsive to parsing the first dataset stored in the first data environment to identify one or more data attributes associated with the first dataset, transmit a first policy identifier and the identified one or more data attributes to the policy repository;

store one or more standardized code arguments in the policy repository, wherein each of the one or more standardized code arguments apply a respective policy to a dataset stored in one of one or more data environments;

receive a classification code from the policy repository for each of the one or more identified data attributes based on the first policy identifier by receiving a list of approved standardized code arguments that can be automatically applied to a dataset, the classification code comprising a code argument of the one or more standardized code arguments to be automatically applied to a respective data attribute, wherein a first classification code received from the policy repository comprises a standardized code argument for data masking or tokenization;

query the metadata repository to determine a data steward for the first dataset;

monitor a compliance management database for a change of approval by the data steward;

receive a data steward approval from the compliance management database;

transmit instructions to the first data environment to execute each classification code for each of the one or more identified data attributes to modify the first dataset in the first data environment; and update the metadata repository with missing data attributes.

8. The system of claim 7, wherein identifying one or more data attributes associated with the first dataset comprises identifying data attributes that are missing from the metadata repository by:

scanning the first dataset to identify every attribute associated with the first dataset; and comparing every attribute associated with the first dataset to a set of attributes stored in the metadata repository; and identifying attributes that are included in every attribute associated with the first dataset and that are not included in the set of attributes stored in the metadata repository.

9. The system of claim 8, wherein the set of attributes stored in the metadata repository is identified by querying the metadata repository with a dataset identifier of the first dataset.

10. The system of claim 7, wherein the instructions are configured to cause the system to:

determine the first policy identifier associated with the first dataset based on the first data environment.

11. The system of claim 7, wherein executing each classification code for each of the one or more identified data attributes causes each of the one or more identified data attributes to automatically have standardized code arguments applied to conform with classification requirements for each specific data attribute based on the first policy identifier.

12. The system of claim 7, wherein the missing data attributes comprise the identified one or more data attributes.

13. The system of claim 12, wherein entries in the policy repository are used to update the metadata repository with the missing data attributes.

14. The system of claim 7, wherein the data steward comprises a permissioned user associated with the first dataset.

15. A method comprising:
receiving, by a classification management device, a first dataset stored in a first data environment of a plurality of data environments;
responsive to parsing, by the classification management device, the first dataset stored in the first data environment to identify one or more data attributes associated with the first dataset that are missing from a metadata repository, transmitting, by the classification management device, a first policy identifier and the identified one or more data attributes to a policy repository;
storing, by the classification management device, one or more standardized code arguments in the policy repository, wherein each of the one or more standardized code arguments is designed to apply a respective policy to a dataset stored in one of the plurality of data environments;
receiving, by the classification management device, a classification code from the policy repository for each of the one or more identified data attributes based on the first policy identifier by receiving a list of approved standardized code arguments that can be automatically applied to a dataset, the classification code comprising a code argument of the one or more standardized code arguments to be automatically applied to a respective data attribute, wherein a first classification code received from the policy repository comprises a standardized code argument for data masking or tokenization;
transmitting, by the classification management device, instructions to the first data environment to execute each classification code for each of the one or more identified data attributes to modify the first dataset in the first data environment; and
updating, by the classification management device, the metadata repository with the identified one or more data attributes.

16. The method of claim 15, wherein identifying one or more data attributes associated with the first dataset that are missing from the metadata repository comprises:
scanning the first dataset to identify every attribute associated with the first dataset; and
comparing every attribute associated with the first dataset to a set of attributes stored in the metadata repository; and
identifying attributes that are included in every attribute associated with the first dataset and that are not included in the set of attributes stored in the metadata repository.

17. The system of claim 1, wherein each data attribute represents a type of a data stored in a particular dataset.

18. The method of claim 15, further comprising determining the first policy identifier associated with the first dataset based on the first data environment.

19. The method of claim 15, wherein entries in the policy repository are used to update the metadata repository with the identified one or more data attributes.

20. The method of claim 15, wherein executing each classification code for each of the one or more identified data attributes causes each of the one or more identified data attributes to automatically have standardized code arguments applied to conform with classification requirements for each specific data attribute based on the first policy identifier.

* * * * *